(12) United States Patent
Renault (10) Patent No.: US 11,492,940 B2
(45) Date of Patent: Nov. 8, 2022

(54) EXHAUST BACK PRESSURE AND TEMPERATURE MONITORING TRANSPORT REFRIGIRATION UNIT

(71) Applicants: Carrier Corporation, Palm Beach Gardens, FL (US); Loic Renault, Saint Etienne du Rouvray (FR)

(72) Inventor: Loic Renault, Saint Etienne du Rouvray (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/047,577

(22) PCT Filed: Apr. 27, 2018

(86) PCT No.: PCT/IB2018/000620
§ 371 (c)(1),
(2) Date: Oct. 14, 2020

(87) PCT Pub. No.: WO2019/207333
PCT Pub. Date: Oct. 31, 2019

(65) Prior Publication Data
US 2021/0148264 A1 May 20, 2021

(51) Int. Cl.
*F01N 3/20* (2006.01)
*B60P 3/20* (2006.01)
(Continued)

(52) U.S. Cl.
CPC .................. *F01N 3/20* (2013.01); *B60P 3/20* (2013.01); *F01N 11/002* (2013.01);
(Continued)

(58) Field of Classification Search
CPC .... F01N 11/002; F01N 13/002; F01N 13/008; F01N 2560/06; F01N 2560/08;
(Continued)

(56) References Cited

U.S. PATENT DOCUMENTS 6,167,698 B1 1/2001 King et al.
6,192,676 B1 2/2001 Zurbig et al.
(Continued)

FOREIGN PATENT DOCUMENTS

CN 101395347 A 3/2009
CN 201496130 U 6/2010
(Continued)

OTHER PUBLICATIONS

International Search Report Application No. PCT/IB2018/000620; dated Aug. 30, 2018; pp. 8.
(Continued)

*Primary Examiner* — Anthony Ayala Delgado
(74) *Attorney, Agent, or Firm* — Cantor Colburn LLP (57) ABSTRACT

A transport refrigeration unit (TRU) is provided and includes a power generation unit, a catalytic element, a tubular element fluidly interposed between the power generation unit and the catalytic element and a control System. The control System is disposed and configured to control operations of the power generation unit in accordance with readings of sensed characteristics of fluid flows between the power generation unit and the catalytic element.

17 Claims, 4 Drawing Sheets

(51) Int. Cl.
  *F01N 11/00* (2006.01)
  *F01N 13/00* (2010.01)
  *F02D 35/00* (2006.01)

(52) U.S. Cl.
  CPC ....... *F01N 13/008* (2013.01); *F02D 35/0015* (2013.01); *F01N 2560/06* (2013.01); *F01N 2560/08* (2013.01)

(58) Field of Classification Search
  CPC ............. F01N 2560/14; F01N 2590/08; F01N 2590/10; F01N 2900/0416; F01N 2900/1404; F01N 2900/1406; F01N 3/00; F01N 3/20; F01N 9/00; B60P 3/20; F02D 35/0015
  See application file for complete search history.

(56) References Cited

U.S. PATENT DOCUMENTS

| | | | |
|---|---|---|---|
| 6,708,104 | B2 | 3/2004 | Avery et al. |
| 6,947,831 | B2 | 9/2005 | Van Nieuwstadt |
| 7,031,827 | B2 | 4/2006 | Trudell et al. |
| 7,374,600 | B2 | 5/2008 | Avery et al. |
| 7,437,874 | B2 | 10/2008 | Ramamurthy et al. |
| 7,568,383 | B2 | 8/2009 | Colvin et al. |
| 7,614,231 | B2 | 11/2009 | Allain et al. |
| 7,805,986 | B2 | 10/2010 | Colvin et al. |
| 8,235,013 | B2 | 8/2012 | Spiegel et al. |
| 9,068,492 | B2 | 6/2015 | Bogema |
| 9,239,016 | B2 | 1/2016 | Leone et al. |
| 2004/0226287 | A1 | 11/2004 | Edgar et al. |
| 2005/0247051 | A1 | 11/2005 | Wagner et al. |
| 2009/0031715 | A1 | 2/2009 | Fluga et al. |
| 2009/0107114 | A1 | 4/2009 | Ammineni et al. |
| 2010/0024395 | A1* | 2/2010 | Gotou ..................... F01N 3/023 60/277 |
| 2010/0101409 | A1 | 4/2010 | Bromberg et al. |
| 2010/0186373 | A1* | 7/2010 | Pierz ....................... F01N 3/027 60/274 |
| 2011/0283676 | A1 | 11/2011 | Reichelderfer et al. |
| 2016/0006066 | A1* | 1/2016 | Robertson ............... F03D 9/007 429/418 |
| 2016/0061129 | A1 | 3/2016 | Lutz et al. |
| 2016/0290260 | A1 | 10/2016 | Marlett et al. |
| 2017/0130630 | A1 | 5/2017 | Younkins et al. |
| 2018/0038257 | A1 | 2/2018 | Uhrich et al. |

FOREIGN PATENT DOCUMENTS

| | | |
|---|---|---|
| CN | 102084096 A | 6/2011 |
| CN | 102939443 A | 3/2013 |
| DE | 19518213 A1 | 11/1996 |
| DE | 10160704 A1 | 6/2003 |
| DE | 102017117739 A1 | 2/2018 |
| EP | 0939206 A2 | 9/1999 |
| EP | 2116698 A1 | 11/2009 |
| EP | 2942505 A1 | 11/2015 |
| KR | 20080051884 A | 6/2008 |
| WO | 2013134238 A1 | 9/2013 |
| WO | 2015023350 A1 | 2/2015 |
| WO | 2016137870 A1 | 9/2016 |
| WO | 2017058518 A1 | 4/2017 |

OTHER PUBLICATIONS

Written Opinion No. PCT/IB2018/000620; dated Aug. 30, 2018; pp. 6.
Office Action issued in Chinese Application No. 201880092746.6; Application Filing Date Apr. 27, 2018; dated Apr. 11, 2022 (17 pages).

\* cited by examiner

EXHAUST BACK PRESSURE AND TEMPERATURE MONITORING TRANSPORT REFRIGIRATION UNIT

CROSS-REFERENCE TO RELATED APPLICATIONS

This application is a National Phase of PCT Application No. PCT/IB2018/000620 filed Apr. 27, 2018, the disclosure of which is incorporated herein by reference in its entirety.

BACKGROUND

The following description relates to transport refrigeration units (TRUs) and, more specifically, to TRUs that monitor exhaust back pressures and temperatures.

Engines that are installed inside TRUs must comply with engine manufacturer specifications. These specifications include exhaust back pressure specifications. An exhaust back pressure that is within an expected or predictable range leads to correct or proper engine running operations. On the other hand, a broken or damaged exhaust system may generate back pressures that are outside of expected ranges and could lead to faulty engine operations, such as those where exhaust gas temperatures are indicative of an overheating instance and a potential a thermal event inside the TRU.

BRIEF DESCRIPTION

According to an aspect of the disclosure, a transport refrigeration unit (TRU) is provided and includes a power generation unit, a catalytic element, a tubular element fluidly interposed between the power generation unit and the catalytic element and a control system. The control system is disposed and configured to control operations of the power generation unit in accordance with readings of sensed characteristics of fluid flows between the power generation unit and the catalytic element.

In accordance with additional or alternative embodiments, the power generation unit includes an engine and an exhaust manifold through which products of combustion within the engine are flown.

In accordance with additional or alternative embodiments, the control system includes a sensor array operably disposed on a tubular element, which is fluidly interposed between the power generation unit and the catalytic element, to sense characteristics of fluid flows therein and a control unit disposed in signal communication with the sensor array and configured to control operations of the power generation unit in accordance with readings of the sensed characteristics that are generated by the sensor array.

In accordance with additional or alternative embodiments, the sensor array includes a back pressure sensor disposed and configured to sense a back pressure of the fluid flows and a temperature sensor disposed and configured to sense a temperature of the fluid flows. The back pressure sensor is disposed upstream from the temperature sensor.

In accordance with additional or alternative embodiments, the control unit is configured to compare the readings with specifications, generate an action to be taken by the power generation unit in order to adjust the readings to an extent the readings differ from the specifications and issue commands to the power generation unit in accordance with the action.

In accordance with additional or alternative embodiments, the specifications include respective ranges of back pressures and temperatures of the fluid flows.

In accordance with additional or alternative embodiments, the TRU further includes a downstream exhaust system, a downstream tubular element fluidly interposed between the catalytic element and the downstream exhaust system and a downstream sensor array operably disposed on the downstream tubular element to sense additional characteristics of downstream fluid flows therein. The control unit is disposed in signal communication with the downstream sensor array and is further configured to control operations of the power generation unit in accordance with readings of the sensed additional characteristics that are generated by the downstream sensor array.

In accordance with additional or alternative embodiments, the downstream sensor array includes a temperature sensor disposed and configured to sense a temperature of the downstream fluid flows.

According to an aspect of the disclosure, a transport refrigeration unit (TRU) is provided and includes a power generation unit, a catalytic element, a tubular element fluidly interposed between the power generation unit and the catalytic element, a sensor array operably disposed on the tubular element to sense characteristics of fluid flows therein and a control unit. The control unit is disposed in signal communication with the sensor array and configured to control operations of the power generation unit in accordance with readings of the sensed characteristics that are generated by the sensor array.

In accordance with additional or alternative embodiments, the power generation unit includes an engine and an exhaust manifold through which products of combustion within the engine are flown.

In accordance with additional or alternative embodiments, the sensor array includes a back pressure sensor disposed and configured to sense a back pressure of the fluid flows and a temperature sensor disposed and configured to sense a temperature of the fluid flows. The back pressure sensor is disposed upstream from the temperature sensor.

In accordance with additional or alternative embodiments, the control unit is configured to compare the readings with specifications, generate an action to be taken by the power generation unit in order to adjust the readings to an extent the readings differ from the specifications and issue commands to the power generation unit in accordance with the action.

In accordance with additional or alternative embodiments, the specifications include respective ranges of back pressures and temperatures of the fluid flows.

In accordance with additional or alternative embodiments, the TRU further includes a downstream exhaust system, a downstream tubular element fluidly interposed between the catalytic element and the downstream exhaust system and a downstream sensor array operably disposed on the downstream tubular element to sense additional characteristics of downstream fluid flows therein. The control unit is disposed in signal communication with the downstream sensor array and is further configured to control operations of the power generation unit in accordance with readings of the sensed additional characteristics that are generated by the downstream sensor array.

In accordance with additional or alternative embodiments, the downstream sensor array includes a temperature sensor disposed and configured to sense a temperature of the downstream fluid flows.

According to an aspect of the disclosure, a method of operating a transport refrigeration unit (TRU) is provided. The method includes flowing products of combustion between a power generation unit and a catalytic element, sensing characteristics of fluid flows of the products of combustion between the power generation unit and the catalytic element and controlling operations of the power generation unit in accordance with the sensed characteristics of the fluid flows.

In accordance with additional or alternative embodiments, the sensing includes back pressure and temperature sensing and the controlling includes comparing the back pressures and temperatures of the fluid flows with specifications, generating an action to be taken by the power generation unit in order to adjust the back pressures and temperatures to an extent the back pressures and temperatures differ from the specifications and issuing commands to the power generation unit in accordance with the action.

In accordance with additional or alternative embodiments, the method further includes verifying that the back pressures and temperatures align with the specifications following the taking of the action by the power generation unit, refining the action to be taken by the power generation unit in order to re-adjust the back pressures and temperatures and re-issuing commands to the power generation unit in accordance with the refined action.

In accordance with additional or alternative embodiments, the method further includes flowing the products of combustion between the catalytic element and a downstream exhaust system, the sensing further includes sensing temperatures of downstream fluid flows of the products of combustion between the catalytic element and the downstream exhaust system and the controlling includes comparing the temperatures of the downstream fluid flows with specifications, generating an action to be taken by the power generation unit in order to adjust the temperatures to an extent the temperatures differ from the specifications and issuing commands to the power generation unit in accordance with the action.

In accordance with additional or alternative embodiments, the method further includes verifying that the temperatures align with the specifications following the taking of the action by the power generation unit, refining the action to be taken by the power generation unit in order to re-adjust the temperatures and re-issuing commands to the power generation unit in accordance with the refined action.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, a TRU exhaust system includes a back pressure sensor and at least one or more temperature sensors. The back pressure sensor and a temperature sensor are installed between an exhaust manifold and a muffler and are linked to a TRU computer or controller. The TRU computer or controller is thus able to monitor exhaust pressures and temperatures and to ensure that real-time values for each are compliant with engine manufacturer specifications. In a case of an over pressure or an over temperature, the TRU computer or controller can reduce engine loads. The TRU computer or controller can also warn a user that the event occurred and configure associated systems to enter into a "limp home" failure mode.

Figure 1:
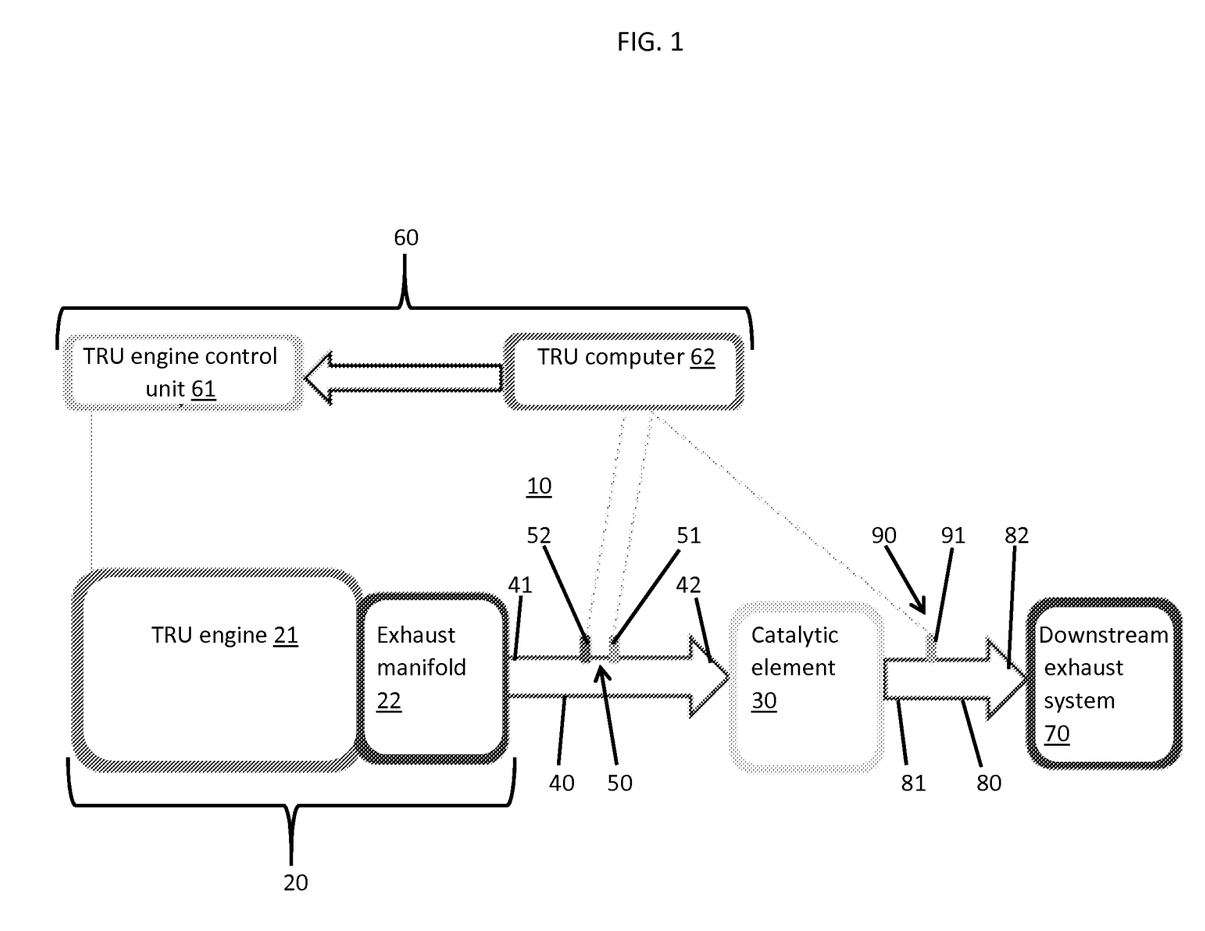
FIG. 1 is a schematic illustration of a transport refrigeration unit (TRU) in accordance with embodiments.

With reference to FIG. 1, a TRU 10 is provided and includes a power generation unit 20, a catalytic element 30, a tubular element 40 that is fluidly interposed between the power generation unit 20 and the catalytic element 30, a sensor array 50 and a control unit 60.

The power generation unit 20 may include an engine or, more particularly, a TRU engine 21 and an exhaust manifold 22. The TRU engine 21 is configured to be receptive of air and fuel, to mix the air and fuel and to combust the air and fuel to generate high pressure and high temperature products of combustion. Once generated in the TRU engine 21, the products of combustion are flown through the exhaust manifold 22, which is disposed adjacent to the TRU engine 21. The catalytic element 30 may be provided as any system or device that is capable of catalyzing the products of combustion and may be further provided within a muffler or another suitable device. The tubular element 40 is coupled at an upstream end 41 thereof to the exhaust manifold 22 and at a downstream end 42 thereof to the catalytic element 30 and is formed to define a flow path from the exhaust manifold 22 to the catalytic element 30 by which the products of combustion in the TRU engine 21 can flow as fluid flows from the exhaust manifold 22 to the catalytic element 30.

The sensor array 50 is operably disposed on the tubular element 40 to sense characteristics of the fluid flows in the tubular element 40. In accordance with embodiments, the sensor array 50 may include a temperature sensor 51, which is disposed and configured to sense temperatures of the products of combustion in the fluid flows, and a back pressure sensor 52, which is disposed upstream from the temperature sensor 51 and which is disposed and configured to sense back pressures of the products of the combustion in the fluid flows.

The control unit 60 is disposed in wired or wireless signal communication with the sensor array 50 and is configured to control operations of the power generation unit 20 in accordance with readings of the sensed characteristics (e.g., the back pressures and temperatures of the products of combustion in the fluid flows) that are generated by the sensor array 50. The control unit 60 may include a TRU engine control unit 61, which is configured to control various operations of the TRU engine 21 and the exhaust manifold 22, and a TRU computer 62. The TRU engine control unit 61 and the TRU computer 62 may be provided as components of a same control element or as standalone components.

In any case, the TRU engine control unit 61 and the TRU computer 62 cooperatively control power generation unit 20 operations in a closed-loop control system. For example, the TRU computer 62 is receptive of the readings of the sensed characteristics from the sensor array 50 and is configured to compare the readings with specifications, such as engine or TRU engine specifications generated or developed by the manufacturer and to generate an action to be taken by the power generation unit 20 in order to adjust the readings to an extent the readings differ from the specifications. The TRU computer 62 is further configured to instruct the TRU engine control unit 61 as to the generated action to be taken by the power generation unit 20 and the TRU engine control unit 61 is configured to be receptive of such instructions and to issue commands to the power generation unit 20 in accordance with the action.

In accordance with embodiments, the specifications, such as the engine or TRU engine specifications, may include ranges of back pressures and ranges of temperatures of the fluid flows of the products of combustion and may be dependent or variable based on a capacity of the TRU engine 21, current atmospheric or ambient conditions and current engine loads.

In accordance with further embodiments, to an extent the readings of the sensed characteristics received from the sensor array 50 are indicative of back pressures or temperatures that are outside (i.e., higher or lower) of the respective ranges, the readings could be indicative of a malfunction or failure within the power generation unit 20. In addition, such readings could be indicative of the catalytic element 30 working improperly due to the influx of excessively high or low pressure or excessively high or low temperature fluids. In either case, the control unit 60 is then responsible for determining that an issue is currently in effect and effectively taking action to address or mitigate the issue.

In accordance with further embodiments, the TRU 10 may further include a downstream exhaust system 70, a downstream tubular element 80 that is fluidly interposed between the catalytic element 30 and the downstream exhaust system 70 and a downstream sensor array 90. The downstream tubular element 80 is coupled at an upstream end 81 thereof to the catalytic element 30 and at a downstream end 82 thereof to the downstream exhaust system 70 and is formed to define a flow path from the catalytic element 30 to the downstream exhaust system 70 by which the products of combustion can flow as downstream fluid flows from the catalytic element 30 to the downstream exhaust system 70.

The downstream sensor array 90 is operably disposed on the downstream tubular element 80 to sense additional characteristics of the downstream fluid flows in the downstream tubular element 80. In accordance with embodiments, the downstream sensor array 90 may include a downstream temperature sensor 91, which is disposed and configured to sense temperatures of the products of combustion in the downstream fluid flows. Here, the control unit 60 is disposed in wired or wireless signal communication with the downstream sensor array 90 and is further configured to control operations of the power generation unit 20 as described above and in accordance with readings of the sensed additional characteristics that are generated by the downstream sensor array 90.

Figure 2:
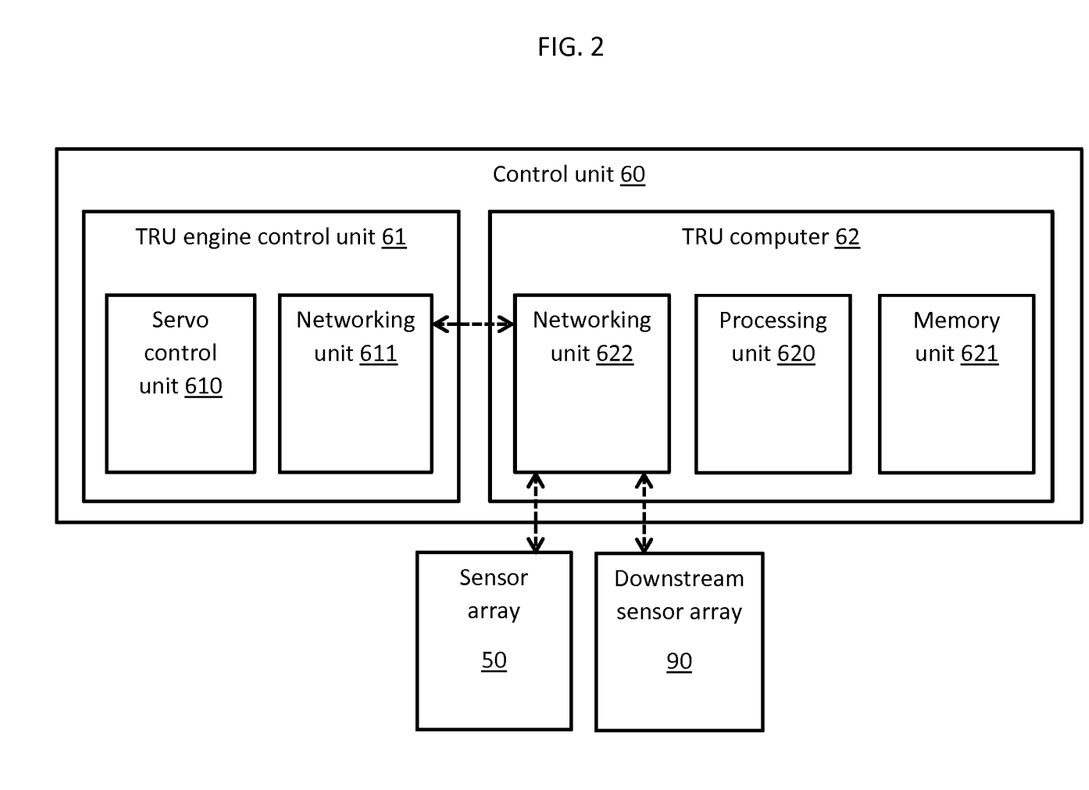
FIG. 2 is a schematic diagram of a control unit of the TRU of FIG. 1 in accordance with embodiments.

With reference to FIG. 2, the control unit 60 includes the TRU engine control unit 61 and the TRU computer 62. The TRU engine control unit 61 may include a servo control unit 610, which is operably coupled to the power generation unit 20, and a networking unit 611 by which the servo control unit 610 is communicative with the TRU computer 62. The TRU computer 62 may include a processing unit 620, a memory unit 621 and a networking unit 622 by which the processing unit 620 is communicative with the sensor array 50, the downstream sensor array 90 and the networking unit 611. The memory unit 621 has the engine or the TRU engine specifications and executable instructions stored thereon. The executable instructions are readable and executable by the processing unit 620. When the executable instructions are read and executed by the processing unit 620, the executable instructions cause the processing unit 620 to operate as described herein and, in particular, to operate as described with reference to the method of FIG. 3.

Figure 3:
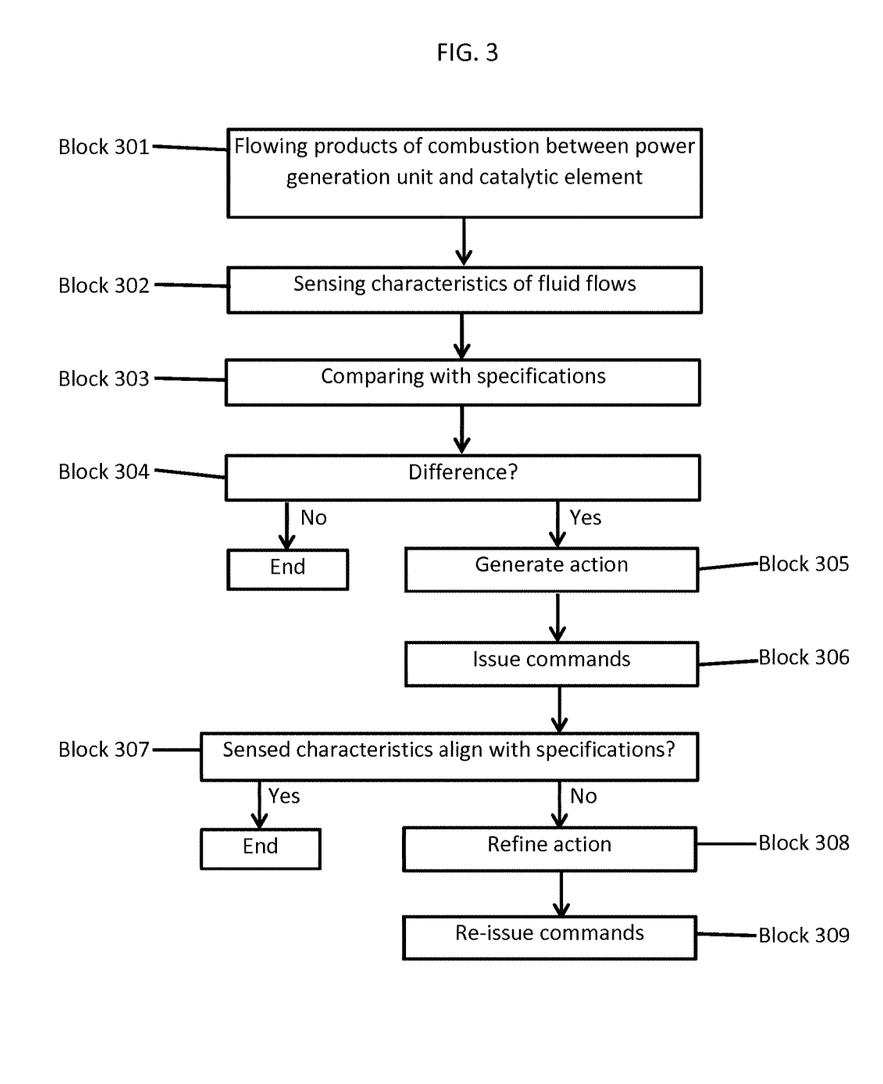
FIG. 3 is a flow diagram illustrating a method of operating a transport refrigeration unit (TRU) in accordance with embodiments.

With reference to FIG. 3, a method of operating the TRU 10 is provided for execution by the components of the TRU 10 and the processing unit 620 in particular.

As shown in FIG. 3, the method includes flowing the products of combustion between the power generation unit 20 and the catalytic element 30 (block 301) and sensing characteristics of fluid flows of the products of combustion (by sensing e.g., back pressures and temperatures thereof) between the power generation unit 20 and the catalytic element 30 (block 302). The method further includes controlling operations of the power generation unit 20 in accordance with the sensed characteristics of the fluid flows (where it will be assumed that the sensed characteristics are back pressures and temperatures thereof) by comparing the back pressures and temperatures of the fluid flows with specifications (block 303), determining whether the back pressures and temperatures differ from the specifications (block 304), generating an action to be taken by the power generation unit 20 in order to adjust the back pressures and temperatures to an extent the back pressures and temperatures differ from the specifications (block 305) and issuing commands to the power generation unit 20 in accordance with the action (block 306).

The method of FIG. 3 may further include verifying that the back pressures and temperatures align with the specifications following the taking of the action by the power generation unit 20 and determining whether the back pressures and temperatures still differ from the specifications (block 307), refining the action to be taken by the power generation unit 20 in order to re-adjust the back pressures and temperatures (block 308) and re-issuing commands to the power generation unit 20 in accordance with the refined action (block 309).

Figure 4:
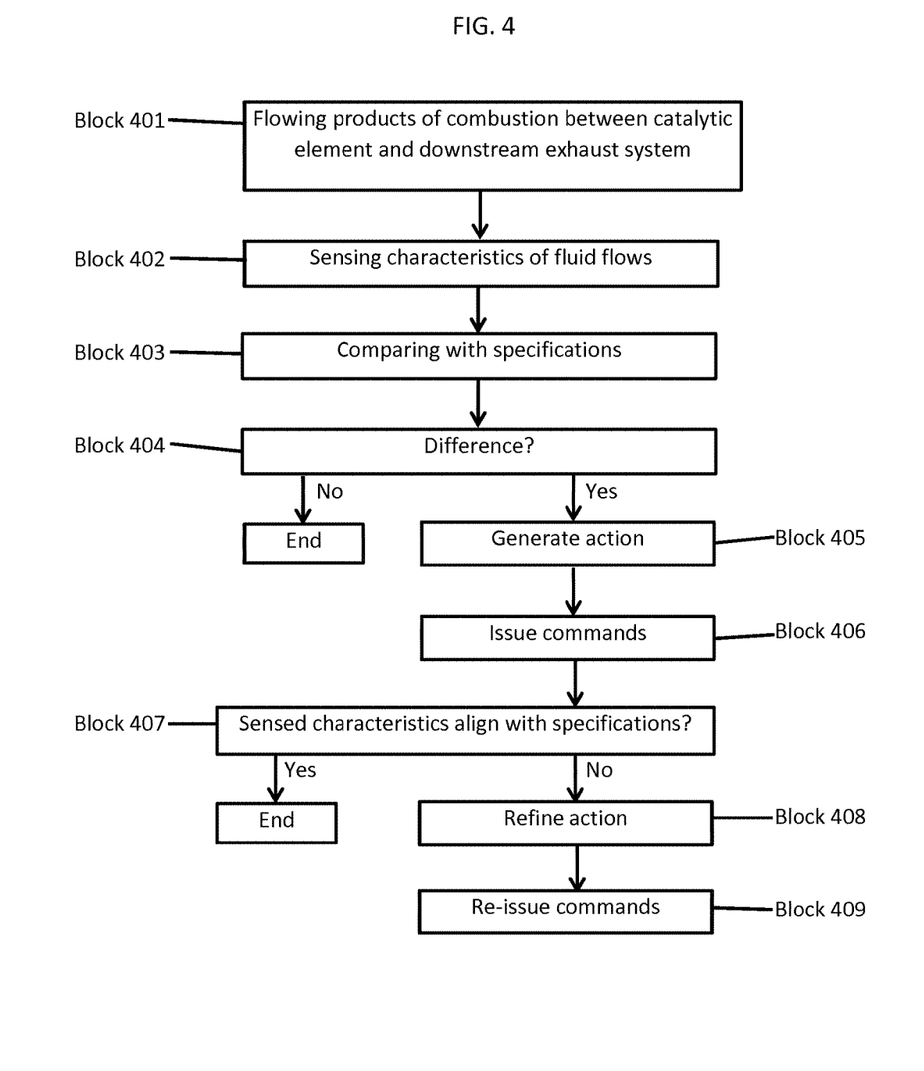
FIG. 4 is a flow diagram illustrating a further method of operating a transport refrigeration unit (TRU) in accordance with embodiments.

With reference to FIG. 4, a further method of operating the TRU 10 is provided for execution by the components of the TRU 10 and the processing unit 620 in particular.

As shown in FIG. 4, the further method includes flowing the products of combustion between the catalytic element 30 and the downstream exhaust system 70 (block 401) and sensing additional characteristics of downstream fluid flows of the products of combustion (by sensing e.g., temperatures thereof) between the catalytic element 30 and the downstream exhaust system 70 (block 402). The further method also includes controlling operations of the power generation unit 20 in accordance with the sensed additional characteristics of the downstream fluid flows (where it will be assumed that the sensed additional characteristics are temperatures thereof) by comparing the temperatures of the downstream fluid flows with specifications (block 403), determining whether the temperatures differ from the specifications (block 404), generating an action to be taken by the power generation unit 20 in order to adjust the temperatures to an extent the temperatures differ from the specifications (block 405) and issuing commands to the power generation unit 20 in accordance with the action (block 406).

The method of FIG. 4 may further include verifying that the temperatures align with the specifications following the taking of the action by the power generation unit 20 and determining whether the temperatures still differ from the specifications (block 407), refining the action to be taken by the power generation unit 20 in order to re-adjust the temperatures (block 408) and re-issuing commands to the power generation unit 20 in accordance with the refined action (block 409).

In accordance with embodiments, the action to be taken by the power generation unit 20 in FIGS. 3 and 4 may be a reduction in engine loads, which will cool and reduce the back pressures of the fluid flows in an event the back pressures and temperatures are excessive, and/or the initiation of a "limp home" failure mode that will substantially reduce engine loads and otherwise cause the power generation unit 20 to operate in a reduced performance condition. In addition, the control unit 60 may also issue a warning or an alert to a user or operator that an issue is in effect and that, in some cases, an action has been taken accordingly.

Technical effects and benefits of the present disclosure are that engine specification compliancy is secured and that TRU engine mode running operations are secured as well. The disclosure provides for a robust design that also provides for fire prevention.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A transport refrigeration unit (TRU), comprising:
a power generation unit;
a catalytic element;
a tubular element fluidly interposed between the power generation unit and the catalytic element; and
a control system comprising a sensor array operably disposed on the tubular element to sense characteristics of fluid flows therein,
the sensor array comprising a back pressure sensor disposed and configured to sense a back pressure of the fluid flows, a furthest-upstream temperature sensor disposed and configured to sense a temperature of the fluid flows and a downstream temperature sensor, the back pressure sensor being disposed upstream from the furthest-upstream temperature sensor, and
a control unit disposed in signal communication with the sensor array and configured to control operations of the power generation unit in accordance with readings of sensed characteristics generated by the sensor array,
the control system being disposed and configured to control operations of the power generation unit in accordance with readings of sensed characteristics comprising the back pressure and the temperature of the fluid flows between the power generation unit and the catalytic element.

2. The TRU according to claim 1, wherein the power generation unit comprises:
an engine; and
an exhaust manifold through which products of combustion within the engine are flown.

3. The TRU according to claim 1, wherein the control unit is configured to:
compare the readings with specifications;
generate an action to be taken by the power generation unit in order to adjust the readings to an extent the readings differ from the specifications; and
issue commands to the power generation unit in accordance with the action.

4. The TRU according to claim 3, wherein the specifications comprise respective ranges of back pressures and temperatures of the fluid flows.

5. The TRU according to claim 1, further comprising:
a downstream exhaust system;
a downstream tubular element fluidly interposed between the catalytic element and the downstream exhaust system; and
a downstream sensor array operably disposed on the downstream tubular element to sense additional characteristics of downstream fluid flows therein,
wherein the control unit is disposed in signal communication with the downstream sensor array and is further configured to control operations of the power generation unit in accordance with readings of the sensed additional characteristics that are generated by the downstream sensor array.

6. The TRU according to claim 5, wherein the downstream sensor array comprises the downstream temperature sensor disposed and configured to sense a temperature of the downstream fluid flows.

7. A transport refrigeration unit (TRU), comprising:
a power generation unit;
a catalytic element;
a tubular element fluidly interposed between the power generation unit and the catalytic element;
a sensor array operably disposed on the tubular element to sense characteristics of fluid flows therein; and
a control unit disposed in signal communication with the sensor array and configured to control operations of the power generation unit in accordance with readings of the sensed characteristics that are generated by the sensor array,
wherein:
the sensor array comprises a back pressure sensor disposed and configured to sense a back pressure of the fluid flows, a furthest-upstream temperature sensor disposed and configured to sense a temperature of the fluid flows and a downstream temperature sensor, the back pressure sensor being disposed upstream from the furthest-upstream temperature sensor, and
the control unit is configured to control operations of the power generation unit in accordance with readings of the sensed characteristics comprising the back pressure and the temperature of the fluid flows between the power generation unit and the catalytic element.

8. The TRU according to claim 7, wherein the power generation unit comprises:
an engine; and
an exhaust manifold through which products of combustion within the engine are flown.

9. The TRU according to claim 7, wherein the control unit is configured to:
   compare the readings with specifications;
   generate an action to be taken by the power generation unit in order to adjust the readings to an extent the readings differ from the specifications; and
   issue commands to the power generation unit in accordance with the action.

10. The TRU according to claim 9, wherein the specifications comprise respective ranges of back pressures and temperatures of the fluid flows.

11. The TRU according to claim 7, further comprising:
   a downstream exhaust system;
   a downstream tubular element fluidly interposed between the catalytic element and the downstream exhaust system; and
   a downstream sensor array operably disposed on the downstream tubular element to sense additional characteristics of downstream fluid flows therein,
   wherein the control unit is disposed in signal communication with the downstream sensor array and is further configured to control operations of the power generation unit in accordance with readings of the sensed additional characteristics that are generated by the downstream sensor array.

12. The TRU according to claim 11, wherein the downstream sensor array comprises a-the downstream temperature sensor disposed and configured to sense a temperature of the downstream fluid flows.

13. a transport refrigeration unit (TRU), the method comprising:
   flowing products of combustion along a tubular element between a power generation unit and a catalytic element;
   sensing a temperature of fluid flows of the products of combustion between the power generation unit and the catalytic element by a furthest-upstream temperature sensor operably disposed on the tubular element and a downstream temperature sensor;
   sensing a back pressure of the fluid flows of the products of combustion between the power generation unit and the catalytic element by a back pressure sensor operably disposed on the tubular element upstream from the furthest-upstream temperature sensor; and
   controlling operations of the power generation unit in accordance with the sensed characteristics of the fluid flows comprising the back pressure and the temperature of the fluid flows between the power generation unit and the catalytic element.

14. The method according to claim 13, wherein:
   the sensing comprises back pressure and temperature sensing, and
   the controlling comprises:
      comparing the back pressures and temperatures of the fluid flows with specifications;
      generating an action to be taken by the power generation unit in order to adjust the back pressures and temperatures to an extent the back pressures and temperatures differ from the specifications; and
      issuing commands to the power generation unit in accordance with the action.

15. The method according to claim 14, further comprising:
   verifying that the back pressures and temperatures align with the specifications following the taking of the action by the power generation unit;
   refining the action to be taken by the power generation unit in order to re-adjust the back pressures and temperatures; and
   re-issuing commands to the power generation unit in accordance with the refined action.

16. The method according to claim 13, wherein:
   flowing the products of combustion between the catalytic element and a downstream exhaust system;
   the sensing further comprises sensing temperatures of downstream fluid flows of the products of combustion between the catalytic element and the downstream exhaust system, and
   the controlling comprises:
      comparing the temperatures of the downstream fluid flows with specifications;
      generating an action to be taken by the power generation unit in order to adjust the temperatures to an extent the temperatures differ from the specifications; and
      issuing commands to the power generation unit in accordance with the action.

17. The method according to claim 14, further comprising:
   verifying that the temperatures align with the specifications following the taking of the action by the power generation unit;
   refining the action to be taken by the power generation unit in order to re-adjust the temperatures; and
   re-issuing commands to the power generation unit in accordance with the refined action.

* * * * *